REGISTER FOR HIGH FREQUENCY PHASE JITTER

Filed June 30, 1958 3 Sheets-Sheet 1

INVENTORS
Alfred Brunschweiger
and Leonard H. Thompson
BY Sughrue & Rothwell
ATTORNEYS

REGISTER FOR HIGH FREQUENCY PHASE JITTER

Filed June 30, 1958 3 Sheets-Sheet 2

INVENTORS
Alfred Brunschweiger
and Leonard H. Thompson
BY
Sughrue & Rothwell
ATTORNEYS June 19, 1962 A. BRUNSCHWEIGER ET AL 3,040,258

REGISTER FOR HIGH FREQUENCY PHASE JITTER

Filed June 30, 1958 3 Sheets-Sheet 3

INVENTORS
Alfred Brunschweiger
and Leonard H. Thompson
BY Sughrue & Rothwell
ATTORNEYS United States Patent Office 3,040,258

Patented June 19, 1962

3,040,258

REGISTER FOR HIGH FREQUENCY PHASE JITTER

Alfred Brunschweiger and Leonard H. Thompson, Poughkeepsie, N.Y., assignors to International Business Machines Corporation, New York, N.Y., a corporation of New York Filed June 30, 1958, Ser. No. 745,672
14 Claims. (Cl. 328—37)

This invention relates to an electronic register and more particularly to a shift register which is self-synchronous and is adapted to accurately register digital information fed thereto in serial fashion despite the presence of inter-pulse phase shift or jitter.

Signals from a storage medium such as a magnetic tape are fed in serial fashion to a shift register. These signals are composed of the presence or absence of pulses or bits within defined bit periods. It is possible that any one of the bits may appear at any place within its period. It may, for example, appear at precisely the center of the period or in the first, second, third or fourth quarters thereof. The amount of inter-pulse phase shift or displacement is known as phase jitter. In the register of this invention, the introduction of a bit stores a 1 in the first stage and after a suitable delay shifts the count in the register and prepares said register for succeeding entries. If the next period indicates a 0 by the lack of a bit therein, means are provided to shift or advance the count of the register while returning the first stage to its 0 condition. This means may include a pulse generator. The pulse generator will only supply an advance pulse to the register in the event that a predetermined time lapse has occurred since the last 1 bit entry. Thus the register is completely self-synchronous.

If it could be ideally assumed that each bit occurred in the center of the bit period, that is, that there was no phase jitter, then the allowable time lapse would be precisely 1 bit period. However, this is not the case; phase jitter is present and could possibly be as much as plus or minus ½ bit period. This means that the bit may occur prematurely in time with respect to the center of the period as much as approximately ½ of a bit period or it may occur later in time with respect to the center of the bit period as much as approximately ½ a bit period. Nonetheless, it is important that the register be able to register accurately and reliably the digital information fed thereto within certain limits. The register, in other words, must be able to accommodate a certain magnitude of phase jitter.

It is therefore an object of this invention to provide a self-synchronous shift register for registering digital information fed thereto.

More specifically, it is an object of this invention to provide a self-synchronous shift register which will accommodate and register accurately and reliably digital information fed thereto despite a predetermined magnitude of phase jitter.

Other and further objects of this invention will become apparent from a detailed description of the accompanying drawings.

Figure 1:
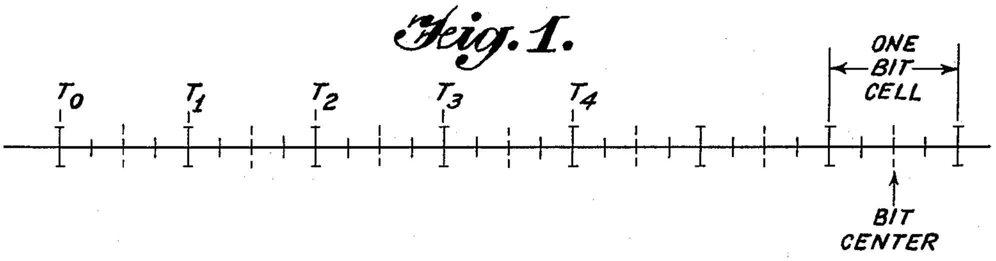
FIG. 1 is a diagrammatic representation of the bit cells and illustrating time divisions within each cell.

In FIG. 1 there is represented a series of consecutive bit cells the time duration of each one being 1 bit period. The presence or absence of a bit within a bit period determines the significance of the information present. It can be seen that in accordance with FIG. 1 the first bit period may be represented in time from $T_0$ to $T_1$. The second bit period is represented in time between $T_2$ and $T_1$ and so on. The center of each bit period is indicated by the dotted line and the quarter bit periods indicated by the small solid lines.

Figure 2A:
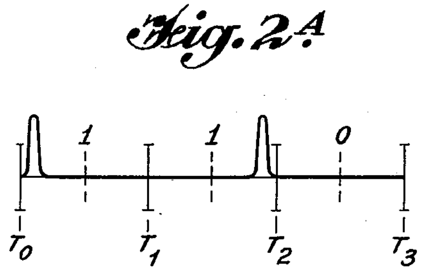
FIGS. 2A and 2B are diagrammatic representations of the possible positioning of bits within bit periods.
Figure 2B:
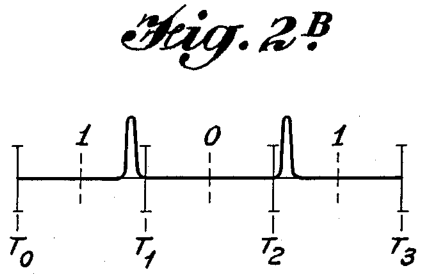

To illustrate the problem of phase jitter, let us refer to FIG. 2A. We see that in the first bit period the bit occurs immediately after time $T_0$ and in the second bit period the bit appears just preceding time $T_2$. The lapse of time between the two consecutive bits approaches 2 bit periods instead of the ideal 1 bit period. In the third bit period there is a lack of a bit representing a 0. The binary number actually represented is 110. In FIG. 2B the binary number actually represented is 101. In the first bit period the bit appears immediately before time $T_1$ and in the third bit period the bit appears immediately after time $T_2$. The separation of bits in this particular instance is something a little more than 1 bit period instead of the ideal 2 bit periods. FIG. 2A illustrates a phase jitter within consecutive bit periods of about plus 1 bit period. FIG. 2B represents a phase jitter of minus 1 bit period in a 101 sequence.

Figures 3, 5:
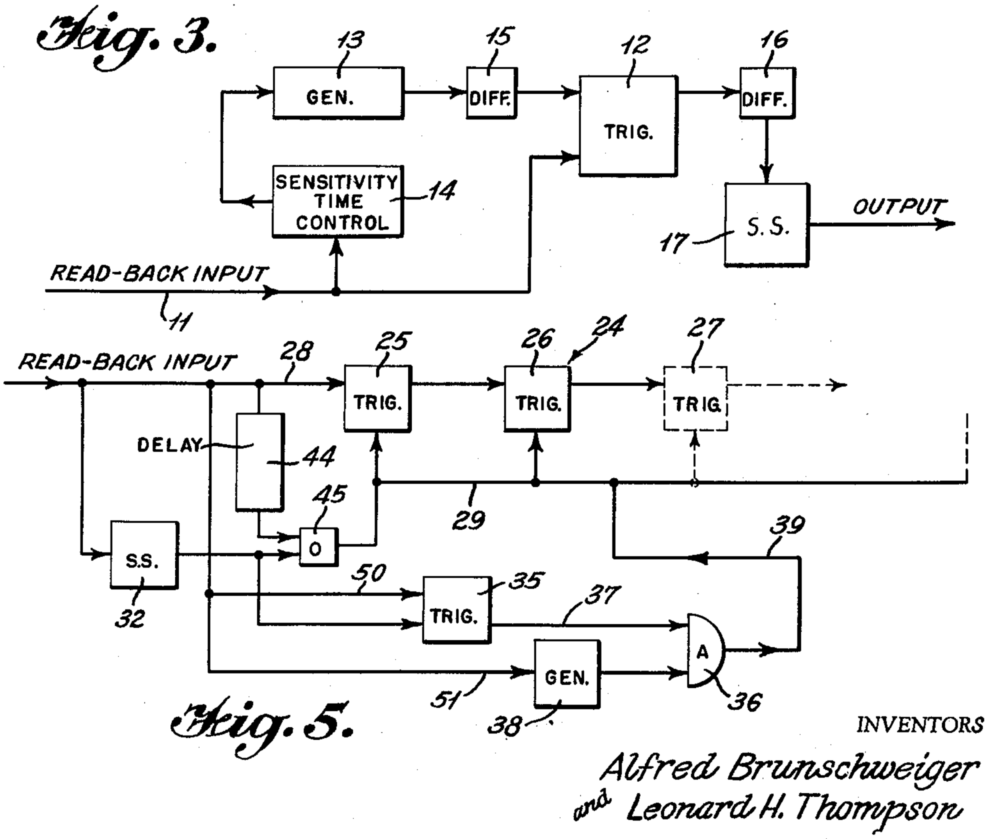
FIG. 3 is a diagrammatic representation of a self-synchronous shift register.
FIG. 5 is a self-synchronous shift register constructed in accordance with this invention.
Figure 4:
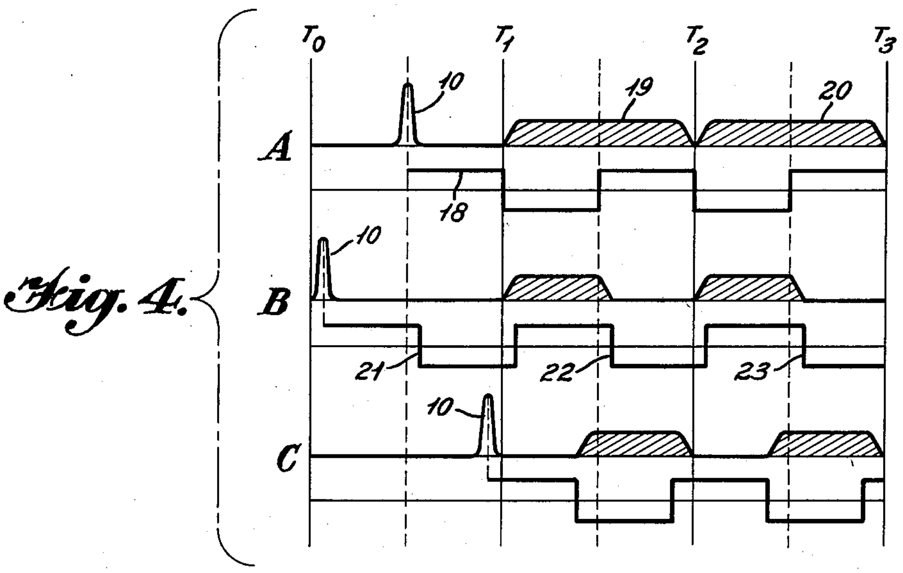
FIG. 4 is a diagrammatic illustration of wave forms obtained under various conditions in the operation of the system of FIG. 3.

Referring to FIG. 3, there is shown a self-synchronous single-stage register wherein the problems created by the phase jitter of FIGS. 2A and 2B can be illustrated. This figure should be viewed in conjunction with FIGS. 4A, 4B, and 4C. In the case of FIG. 4A, consider the entry of a bit 10 provided by the read-back input on line 11, the bit occurring precisely at the bit center of the first bit period $T_0$ to $T_1$. This bit will set the trigger 12 and start the timing generator 13. The characteristics of the unit can be varied by the sensitivity time control 14 which determines the sensitivity of the timing generator to the following bits. The timing generator provides a square wave output. The output from the generator 13 is fed through a differentiator 15 to the trigger 12 in a manner whereby negative-going excursions of the timing generator reset the trigger 12. When the trigger is reset the previous condition of the trigger during the immediately preceding bit period whether it be a 1 condition or a 0 condition is kicked out from the trigger through the differentiator 16 to the single-shot trigger 17 and the trigger 12 reverts to a condition ready to accept succeeding entries from the read-back input. So it can be seen that the resultant output of the timing generator under the conditions of FIG. 4A is illustrated by curve 18. The first negative swing of the timing generator following the entry of the bit 10 into the trigger 12 occurs at precisely time $T_1$. At this time the previous condition of trigger 12 is kicked out, whether it be a 1 or a 0, to the output circuit which in this particular case, rather than being succeeding trigger stages as in the usual case of a multi-stage shift register, is merely illustrated as a differentiator and single-shot trigger. The negative excursion of the timing generator at time $T_1$ resets the trigger to a condition whereby it is in a condition to receive succeeding bits on the read-back input 11. It can be seen from curve 18 that the second bit period between time $T_2$ and $T_1$ finds the trigger 12 in a condition to receive succeeding bits on the read-back input 11 during the entire period. This is shown by the hatched section in FIG. 4A and indicated at 19. Such is also true in the third bit period, $T_2$ to $T_3$, as illustrated by numeral 20.

Now consider the entry of a bit 10 immediately following time $T_0$, that is, approximately ½ bit period removed from the bit center. This is the case in FIG. 4B. In this case the trigger is reset at time indicated at 21, leaving during the second bit period only the time between $T_1$ and time 22 for the reception of a bit during the second bit period. If during the second bit period a bit is presented to the trigger between time $T_2$ and time 22 the register will actually register said bit as belonging to the third bit period. Therefore we can see that in the case of FIG. 2A if the separation of consecutive bits in consecutive bit periods is more than 1½ bit cells this type of system will register the information as 101 instead of 110.

The case of FIG. 2B is illustrated in connection with FIG. 4C. By the same reasoning as above it can be seen that in a case of this type, the binary information 101 from the readback input would be registered as 110. It can be seen from FIG. 4B that in order to correctly register the number 110 the separation of consecutive bits in consecutive bit periods must be less than 1½ bit periods and from FIG. 4C in the case of a 101 sequence the separation of the first bit in the first bit period and the second bit in the third bit period must be greater than 1½ bit periods.

Consequently, in a system such as illustrated above, because of the ambiguity associated with the first bit from the read-back input, the maximum possible jitter or phase displacement of this system is limited to plus or minus ¼ of a bit period. This means that the system can correctly register information fed thereto from the read-back input in which the bits do not vary from the bit center any more than plus or minus ¼ of a bit period.

Figure 6:
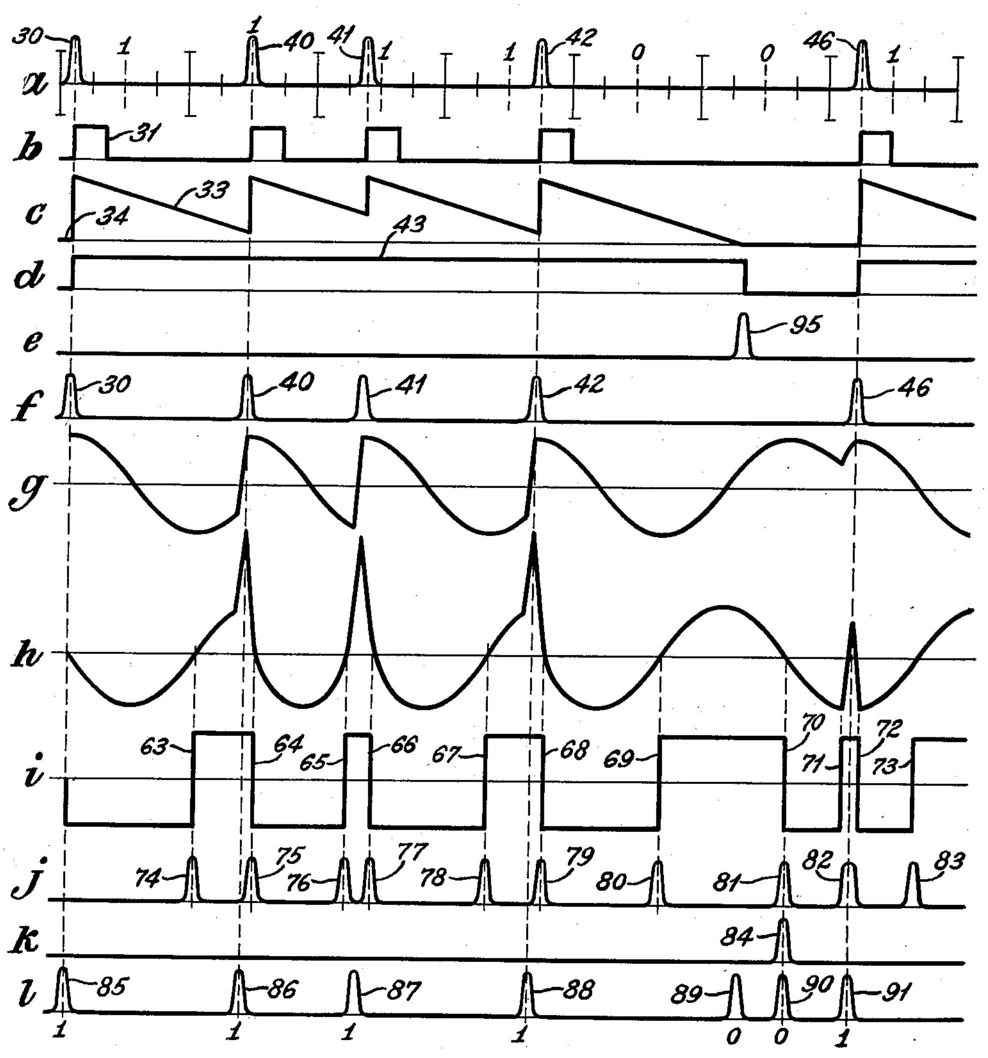
FIG. 6 is a diagrammatic representation of various wave forms obtained from the operation of the register of FIG. 5.

Turning to FIGS. 5 and 6 there is illustrated a system with appropriate wave forms capable of handling somewhat larger phase displacements or jitter. The shift register indicated by the numeral 24 is composed of a plurality of cascaded stages of bistable devices. The first stage is indicated by numeral 25, the second stage by numeral 26, the third stage by numeral 27, and so on. There are as in the usual case two inputs to the shift register 24. The first is the read-back input 28 and the second is the advance input 29. Let us consider the operation of this circuit as illustrated by the wave forms in FIG. 6.

The first bit 30 appearing in the first bit period occurs within the first quarter of this bit cell. It sets trigger 25 as illustrated in curve *6b* by the wave form 31.

It also flips the 1½ bit period single-shot trigger 32 to its unstable state. This trigger 32 may be any conventional monostable trigger. It has a natural period equal to 1½ bit periods, that is, 1½ bit periods after an input pulse thereto it will return to its stable state. Turning to FIG. *6c*, curve 33 illustrates the voltage on a control grid of one of the tubes of the trigger 32. When the control grid is at a voltage level indicated by numeral 34 the trigger will be in its stable state. The pulse 30 will cause the trigger to flip to its unstable state and then the grid circuit will progress to a voltage level at 34 as indicated by curve 33 and if allowed to reach that level would flip the trigger 32 back to its stable state.

Coincidence gate 36 normally has one input leg down, that is, at a low level, because of the low level of the output to it along line 37 from trigger 35 as long as trigger 35 is in its set condition. The trigger 35 is a bistable trigger and is set by pulse 30 fed thereto over line 50. The 0's clock generator 38 is phase-slaved by pulse 30 and provides pulses at a rate equal to the reciprocal of one bit period. As long as trigger 35 is in its set condition as determined by the bit entries on the read-back input 28, gate 36 will be blocked and the pulse output of generator 38 will not feed the advance line 29 via outline 39. Such is the case as long as trigger 32 remains in its unstable state. It is kept there by pulses on the read-back input line 28 occurring no greater than 1½ bit periods apart. In the case illustrated, pulses 30, 40, 41 and 42 occur no greater than 1½ bit periods apart. Trigger 32 remains in its unstable state as shown by curve 43 in FIG. *6d* since the curve 33 of FIG. *6c* never reaches level 34. Each of these pulses after sufficient delay by delay means 44 passes through OR gate 45 to the advance line 29 to advance the count of the register 24. This delay may be about ½ of a bit period, or less if necessary.

After pulse 42 is fed to the register it can be seen that more than 1½ bit periods transpire before the next bit 46 occurs. The trigger 32 as shown by curve 33 in FIG. *6c* and by curve 43 in FIG. *6d* returns to its stable state precisely 1½ bit periods after the occurrence of pulse 42 and provides a reset pulse 95, FIG. *6e*, to trigger 35. This resets trigger 35, raises the level of line 37 to unblock gate 36 to permit passage therethrough of the output pulses from generator 38. Pulse 95 also advances the register to store a 0 therein. The first of these pulses from generator 38 to pass through gate 36 along line 39 to the advance line 29 will advance the trigger 24 and store the second consecutive 0 in the first stage thereof. If another 1½ bit period transpires without a bit entry to the register, another pulse from the generator 38 will again advance the register to store a third consecutive 0. However, should a pulse such as pulse 46 occur on line 28 after generator 38 has advanced the register, the trigger 32 will again be flipped to its unstable state, trigger 35 will block gate 36 and at least the next pulse from generator 38 will be blocked. After sufficient delay, OR gate 35 will pass delay pulse 46 to the advance line 29 to shift the register to store a 1 therein.

From the above it is seen that the register is a self-synchronous type. Each bit entry advances the register after suitable delay within each bit period. If however an arbitrary period of time, greater than one bit period, transpires since the entry to the register of the last bit, a secondary source of advance pulses takes over. This secondary source is activated after this arbitrary time has expired and provides advance pulses to the register. As shown here a timing device such as a one and a half bit period detector and single-shot trigger 32 provides the intial advance pulse from this source and connects to the advance line a generator for subsequent advance pulses if conditions permit. Other means can be used. It is only necessary that this timing means operate after a predetermined time lapse since the last bit entry to the register to permit the generation of advance pulses continuously from the secondary source unless interrupted by a bit entry to the register. In the event that a bit enters the register less than one bit period after an advance pulse from the secondary source, said secondary source is again effectively blocked from the advance input line of the register. However, each bit entry reslaves the clock generator so as to properly prepare it to provide an advance pulse precisely two bit periods after the entry of this slaving bit. In the interim, the trigger has provided an advance pulse one and a half bit periods after the last bit entry.

Figure 7:
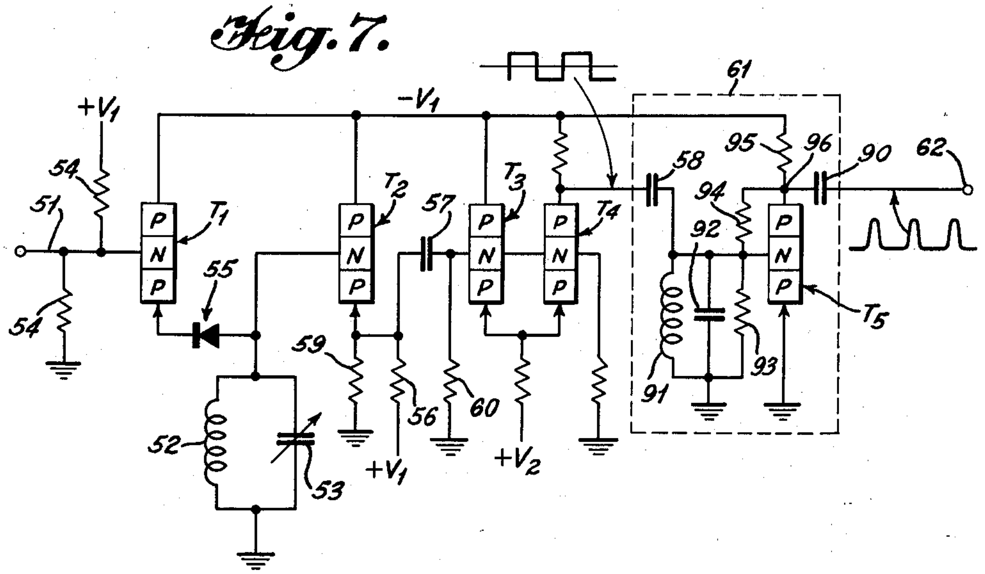
FIG. 7 is a circuit diagram showing a phase slaved generator and unipolar generator constructed in accordance with this invention.

One type of clock generator 38 that can be employed here is shown in FIG. 7. Its operation in connection with the register is best shown by FIGS. *6f* to *6l*, inclusive. Turning to these figures, *6f* indicates the slaving pulses 30, 40, 41, 42, and 46 as fed along line 51 to the clock generator 38. The value of the inductance 52 and the condenser 53 are so chosen as to provide a tank circuit having a natural period equal to twice the period of the desired shifting pulses from the clock generator. In this case the natural frequency is chosen to be two bit periods. The slaving pulses on line 51 are fed to the transistor $T_1$, an emitter follower of the PNP type, which is normally biased to cut off by the voltage divider including resistors 54 and 55 connected between $+V_1$ and ground. A tube having similar characteristics may be substituted for the transistor. $T_1$ has a low output impedance and is capable of clamping the impedance of the tank circuit to the input. The first pulse fed to $T_1$, that is pulse 30, will cause $T_1$ to conduct and drive the tank circuit into oscillation. These oscillations are shown in FIG. 6*g*. It will be noted that pulse 30 establishes the desired initial peak condition of the tank circuit and causes the transistor $T_1$ to conduct and causing the tank circuit to be shunted out by the low impedance of the transistor employed as an emitter follower. After the termination of pulse 30 the tank will continue to ring with the initial phase condition imposed on it by pulse 30. Upon the arrival of pulse 40 a new initial phase condition is created and after the termination of this pulse the tank will continue to ring, now being slaved by pulse 40. Reslaving takes place as long as pulses continue to arrive at the input to the emitter follower $T_1$. The purpose of diode 55 is to isolate the lower back resistance and recovery time characteristic of $T_1$ from the tank circuit.

The slaved oscillations are fed to transistor $T_2$, a PNP type having $+V_1$ supplied to its emitter through resistor 56. $T_2$ is an emitter follower or impedance converter to isolate the tank circuit 52 and 53 from the low impedance of the resistor 60 and the input impedance of $T_3$. This signal is coupled through condenser 57 to transistor $T_3$. This coupling circuit including condenser 57 and resistor 60 also acts to differentiate the output of $T_2$ and provides an input to $T_3$ as shown in FIG. 6*h*. This differentiated signal is amplified and limited by the action of $T_3$ and transistor $T_4$ to provide an output to the condenser 58 as shown by FIG. 6*i*.

Numeral 61 indicates a unipolar pulse generator. It functions to provide a pulse output at 62 always of one polarity for each change in polarity of the input signal thereto. FIG. 6*j* illustrates the output at 62. The input to the generator 61 as shown by FIG. 6*i* is a square wave input having a first positive swing at 63, a first negative swing at 64, a second positive swing at 65, etc. Corresponding to 63 in FIG. 6*i*, the generator 61 provides a positive pulse 74 at output 61. Pulse 75 corresponds to excursion 64, etc.

It can be seen that between pulse 42 and pulse 46, gate 36 is unblocked by pulse 95 (FIG. 6*e*) from single-shot trigger 32 as it returns to its stable state and the next pulse output from generator 61 will unblock gate 36. Pulse 81 from the unipolar generator 61 is generated by the negative excursion 70 in FIG. 6*i*. Since gate 36 is now unblocked, pulse 81 causes output pulse 84 (FIG. 6*k*) from the AND gate 36 to pass along line 39 to the advance line 29. It must be noted that the output from trigger 32, namely pulse 95, also shifts the register since it passes OR gate 50 to the advance line 29. FIG. 6*l* shows all the shift pulses applied to the advance line 29 during this operation. Pulse 85 is delay pulse 30, pulse 86 is delay pulse 40, pulse 87 is delay pulse 41, pulse 88 is delay pulse 42, pulse 89 is OR gate 45 output resulting from pulse 95 from the trigger 32, pulse 90 is AND gate 36 output pulse 84 and pulse 91 is delay pulse 46. The count of the register after pulse 46 is 1111001, which exactly corresponds to the read-back input thereto as shown in FIG. 6*a*, despite the presence of phase jitter.

The slaving of the generator of FIG. 7 has been illustrated as being accomplished by feeding the read-back input pulses directly to the input thereof on line 51. However, other slaving means may be employed. Other means may include a gating voltage applied to line 51 in place of the input pulses. This gate would maintain a low level output to the base of transistor $T_1$ to keep it conducting as long as the single-shot trigger 32 remains in the unstable state but would immediately provide a high level input thereto when trigger 32 reverts to its stable state. This transition would turn off transistor $T_1$ to phase-slave the generator only once, that is, not continuously as each bit is entered to the register but only at a time exactly one and a half bit periods after the introduction of the last bit to the register. As long as bits continue to come into the register less than one and a half bit periods apart the gate would maintain a low level output to the base of transistor $T_1$. Of course the gate would again apply a low level output to $T_1$ whenever another bit entered the trigger.

The functioning of the unipolar generator 61 is to differentiate the input wave thereto and produce a pulse of the same polarity for both the leading and trailing edges of the input wave form. In the case specifically illustrated here, $T_5$ is a PNP grounded emitter transistor with the input thereto applied to the base. To better understand the operation of this circuit, let us first consider the output therefrom at point 62 upon the application of a positive square wave eliminating for the moment the inductance 91 and the condenser 92. If we consider transistor $T_5$ to be conducting at less than saturation because of the value of resistor 94 in the voltage divider including $-V_1$, resistors 93 and 95, such as to forward bias $T_5$ at less than saturation bias, then the positive excursion of the square wave input reduces transistor current and lowers the voltage at point 96 towards $-V_1$. Because of the feedback through resistor 94 this effect is momentary and bias is again readjusted to its original value. This provides a negative pulse at point 62 corresponding in time to the positive excursion of the input to the base of $T_5$. The negative excursion at the base of $T_5$ will produce a positive pulse at point 62. The circuit functions then as a differentiator-inverter when we consider a relatively large value of resistor 94 and the absence of inductance 91 and condenser 92. If resistor 94 is such as to bias $T_5$ to saturation, the positive excursion only would produce an output at point 62, that is, a negative pulse output. The effect of inductance 91 and condenser 92 on the functioning of the circuit is as follows:

The inductance effectively shorts the base of $T_5$ to ground and therefore in the absence of an input $T_5$ is non-conducting. If a positive excursion of an input square wave is applied to the base, condenser 92 charges along with the distributed capacitance of the inductance 91 and $T_5$ remains cut off during this period of input wave transition. When this transition has been completed, the tank circuit, inductance 91 and condenser 92, will ring at or near its resonant frequency. The initial charging of the tank capacitance merely serves to further reverse bias transistor $T_5$ but when the ringing of the tank circuit applies a forward bias to $T_5$, the transistor then conducts. The time of forward bias is approximately one-quarter of a period after the commencement of the tank circuit oscillations. $T_5$ then amplifies the negative excursion of the tank circuit and provides a positive output to point 62. When $T_5$ is conducting it, together with resistor 93, dampens the ringing of the tank circuit sufficiently so that only one pulse is produced by the positive excursion of the input wave form. When this wave form goes negative, the action of the circuit is the same as described with regard to the differentiator-inverter without the tank circuit. Therefore a positive pulse at 62 is also produced for each negative excursion of the input wave form. By proper adjustment of resistance 93, the amplitude of all pulses at point 62 whether due to positive or negative excursions of the input wave form can be made equal in amplitude. The pulse width can be adjusted by adjusting the value of condenser 92. In an actual case, an inductance having a value of ten microhenries was used and the capacitance was supplied by the distributed capacitance of this coil. The pulse width at point 62 was measured as seventy millimicroseconds.

It is seen then that this particular unipolar generator has unique application in conjunction with the phase-slaved generator and self-synchronous register of this invention. It functions to provide a positive pulse at 62 for each excursion either positive or negative of the square wave output from the phase-slaved generator. Since the natural period of the phase-slaved generator is two bit periods, the unipolar generator will produce a positive pulse output precisely two periods after the last bit entry has slaved generator 38. The time between pulses at 62 is one bit period. Since the gate normally preventing the output from the unipolar generator passing to the advance line 29 is unblocked one and a half bit periods after the entry of the last bit, the pulse from the unipolar generator will arrive at this generator after it has been unblocked and will advance the register by applying an advance pulse to the advance line therefor.

While there has been illustrated the embodiment involving feeding the information to be stored to a shift register, the invention is not so limited. The shift register may be used to control the storing of information in individual storage devices. In such an embodiment there may be a plurality of such storage devices each controlled by a separate gate. The information to be stored is fed to all the gates simultaneously but only that gate which is conditioned by the shift register permits said information to pass therethrough to the selected storage device. The shift register in this case originally has a 1 stored in the first stage and this 1 is shifted from stage to stage either by delayed pulse inputs to the gates or in the absence of such pulse inputs for a predetermined time, by the secondary source of advance pulses constructed in accordance with this invention. In such an embodiment, then, information to be stored is fed not to the shift register itself but to gates conditioned thereby. The means to advance the count of the register is, however, exactly as shown here in connection with the use of the register as the storage system for the input information.

What has been described are specific embodiments of the present invention. Other embodiments obvious to those skilled in the art from the teachings herein are contemplated to be within the spirit and scope of the following claims.

What is claimed is:

1. A shift register comprising at least one bistable device, a first pulse input means to supply binary information to said register in the form of a pulse train, a second pulse input means to supply advance pulses to said register, means to feed delay pulses from said first pulse input means to said second input pulse means, a source of advance pulses and means to connect said source to said second pulse input means in the absence of delay pulses thereto for a predetermined time.

2. A shift register comprising at least one bistable device, means to supply pulse information to said register in the form of a pulse train and means to advance said register as a function of the information fed thereto, said last-mentioned means comprising first means to advance said register in response to a pulse supplied thereto and second means to advance said register in response to the absence for a predetermined time of a pulse supplied to said register.

3. A shift register as defined by claim 2 wherein said first means includes means to delay said pulses supplied to said register and means to advance said register in response to said delay pulses.

4. A shift register as defined by claim 2 wherein said second means includes normally inactive pulse supplying means and means to activate said pulse supplying means to advance said register in the absence for a predetermined time of a pulse supplied to said register.

5. A shift register including a plurality of cascaded bistable devices, means to supply pulse information to said register in serial form and means to advance said register, said advance means comprising a pulse delay member, means to feed said input pulses to said delay member and to feed said delayed pulses from said member to said advance means, a second source of advance pulses, means to normally disconnect said source from said advance means and to connect said source to said advance means in the absence of a pulse to said register for a predetermined time.

6. A shift register including at least one bistable device, means to supply pulse information to said register and means to advance said register, said advance means comprising first means to advance said register a predetermined time after the entry of a pulse to said register and second means to advance said register a second predetermined time after entry of said pulses to said register and in the absence of an advance pulse from said first means.

7. A shift register including a plurality of cascaded bistable devices, means to supply pulse information to said register and means to advance said register, said advance means comprising first means to advance said register a first predetermined time after entry of a pulse to said register and a second means to advance said register a second predetermined time after the entry of a pulse to said register.

8. A shift register including a plurality of cascaded bistable devices, means to supply pulse information to said register and means to advance said register, said advance means comprising first means to advance said register a first predetermined time after entry of a pulse to said register and a second means to advance said register a second predetermined time after entry of a pulse to said register, said second predetermined time being greater than said first predetermined time, and said second means operating to advance said register only in the absence of a pulse from said first means for said first predetermined time.

9. A shift register including a plurality of cascaded bistable devices, means to supply pulse information to said register and first means to advance said register a first predetermined time after the entry of a pulse to said register and second means to advance said register in the absence of a pulse to said register for a second predetermined time, said second means comprising a single-shot trigger adapted to provide a single output pulse therefrom on return from its unstable state to its stable state to advance said register, means normally to retain said trigger in its unstable state and to permit said trigger to return to its stable state only upon the absence of a pulse to said register for said second predetermined time, a generator of advance pulses, a normally blocked gate connecting said generator to said register and means to connect the output of said trigger to said gate to unblock said gate upon the production of a trigger pulse to connect said generator to said register whereby said register is advanced by said generator subsequent to the advancement thereof by said trigger.

10. A shift register as defined by claim 9 wherein said first means includes a delay member, means to feed said pulse information to said delay member to produce delayed pulses having a delay time equal to said first predetermined time and means to feed said delayed pulses to said register.

11. A shift register as defined by claim 9 wherein said means normally to retain said trigger in its unstable state comprises means to feed said pulse information to said trigger.

12. A shift register as defined by claim 9 further including a means to feed said pulse information to said pulse generator to phase-slave said generator with said pulse information.

13. A shift register including at least one bistable device and means to advance the count of said register, said advancing means comprising a delay means, means to feed information pulses to said delay means, means to feed said delayed information pulses to said advancing means, a source of advance pulses and means to connect said source to said advancing means in the absence of delayed information pulses thereto for a predetermined time.

14. A shift register for controlling the storage of information pulses in an information storage system including a plurality of cascaded bistable devices and means to advance the count of said register comprising an information pulse input means, means to feed delayed information pulses to said advancing means to advance the count of said register, a source of advance pulses and means to connect said source to said advancing means in the absence of delayed information pulses thereto for a predetermined time.

References Cited in the file of this patent

UNITED STATES PATENTS

| | | |
|---|---|---|
| 2,723,080 | Curtis | Nov. 8, 1955 |
| 2,745,006 | Chu et al. | May 8, 1956 |
| 2,768,296 | Herzog | Oct. 23, 1956 |
| 2,824,961 | Paivinen | Feb. 25, 1958 |
| 2,843,840 | Brinster et al. | July 15, 1958 |
| 2,845,222 | Genna et al. | July 29, 1958 |
| 2,853,697 | Silliman et al. | Sept. 23, 1958 |
| 2,854,582 | Guyton | Sept. 30, 1958 |
| 2,907,996 | Schmidt | Oct. 6, 1959 |